US008651073B2

(12) United States Patent
Cecur

(10) Patent No.: US 8,651,073 B2
(45) Date of Patent: Feb. 18, 2014

(54) LIFT-CONTROL DEVICE FOR A POPPET VALVE OF AN INTERNAL-COMBUSTION ENGINE OR OPERATING MACHINE

(75) Inventor: Majo Cecur, Rivarolo Canavese (IT)

(73) Assignee: Eaton S.R.L. Con Unico Socio, Milan (IT)

( * ) Notice: Subject to any disclaimer, the term of this patent is extended or adjusted under 35 U.S.C. 154(b) by 1086 days.

(21) Appl. No.: 12/375,355

(22) PCT Filed: Jul. 27, 2007

(86) PCT No.: PCT/IB2007/002449
§ 371 (c)(1),
(2), (4) Date: Oct. 27, 2009

(87) PCT Pub. No.: WO2008/012679
PCT Pub. Date: Jan. 31, 2008

(65) Prior Publication Data
US 2010/0095918 A1    Apr. 22, 2010

(30) Foreign Application Priority Data

Jul. 28, 2006 (IT) .............................. TO2006A0563

(51) Int. Cl.
*F01L 1/34* (2006.01)
(52) U.S. Cl.
USPC .................................................... 123/90.16
(58) Field of Classification Search
USPC .......... 123/90.16, 90.24, 90.25, 90.26, 90.39, 123/90.44, 320, 321; 74/568 R
See application file for complete search history.

(56) References Cited

U.S. PATENT DOCUMENTS

| 4,928,650 A | * | 5/1990 | Matayoshi et al. | ........ | 123/90.24 |
| 4,944,256 A | * | 7/1990 | Matayoshi et al. | ........ | 123/90.24 |
| 5,048,474 A | * | 9/1991 | Matayoshi et al. | ........ | 123/90.18 |
| 6,053,134 A | * | 4/2000 | Linebarger | ................. | 123/90.16 |

(Continued)

FOREIGN PATENT DOCUMENTS

EP           568932 A1  * 11/1993
WO    WO2006028410 A       3/2006

OTHER PUBLICATIONS

European Patent Office; International Search Report and the Written Opinion of the International Searching Authority for International Application No. PCT/IB2007/002449; mailed Jan. 28, 2008.

*Primary Examiner* — Thomas Denion
*Assistant Examiner* — Daniel Bernstein
(74) *Attorney, Agent, or Firm* — Dykema Gossett PLLC

(57) ABSTRACT

A lift-control device for a poppet valve of an internal-combustion engine including a first valve-lift means, a second valve-lift means, and a means for selective de-activation of the second valve-lift means. In an embodiment, the first valve-lift means is configured to define a first valve-lift law and is operatively connected with a rocker that acts on a stem of said valve to move said stem according to the first valve-lift law; and the second valve-lift means is configured to define a second valve-lift law and is operatively connected with the rocker. In an embodiment, the first valve-lift means comprises a profile of a cam or eccentric acting on the rocker to cause it to oscillate about a first axis so as to move the valve stem according to the first valve-lift law; and the second valve-lift means comprises an auxiliary rocker that co-operates in contact with the first valve-lift means.

9 Claims, 4 Drawing Sheets

(56) References Cited

U.S. PATENT DOCUMENTS

| | | | |
|---|---|---|---|
| 6,487,997 B2 * | 12/2002 | Palumbo | 123/90.24 |
| 6,688,267 B1 | 2/2004 | Raghavan | |
| 7,140,333 B2 * | 11/2006 | Persson et al. | 123/90.16 |
| 7,559,318 B2 * | 7/2009 | Sahlén | 123/568.14 |
| 7,717,075 B2 * | 5/2010 | Endoh et al. | 123/90.24 |
| 7,739,989 B2 * | 6/2010 | Kimura et al. | 123/90.39 |
| 7,870,842 B2 * | 1/2011 | Decuir | 123/90.24 |
| 2003/0221663 A1 | 12/2003 | Vanderpoel | |
| 2005/0000498 A1 | 1/2005 | Persson | |

* cited by examiner

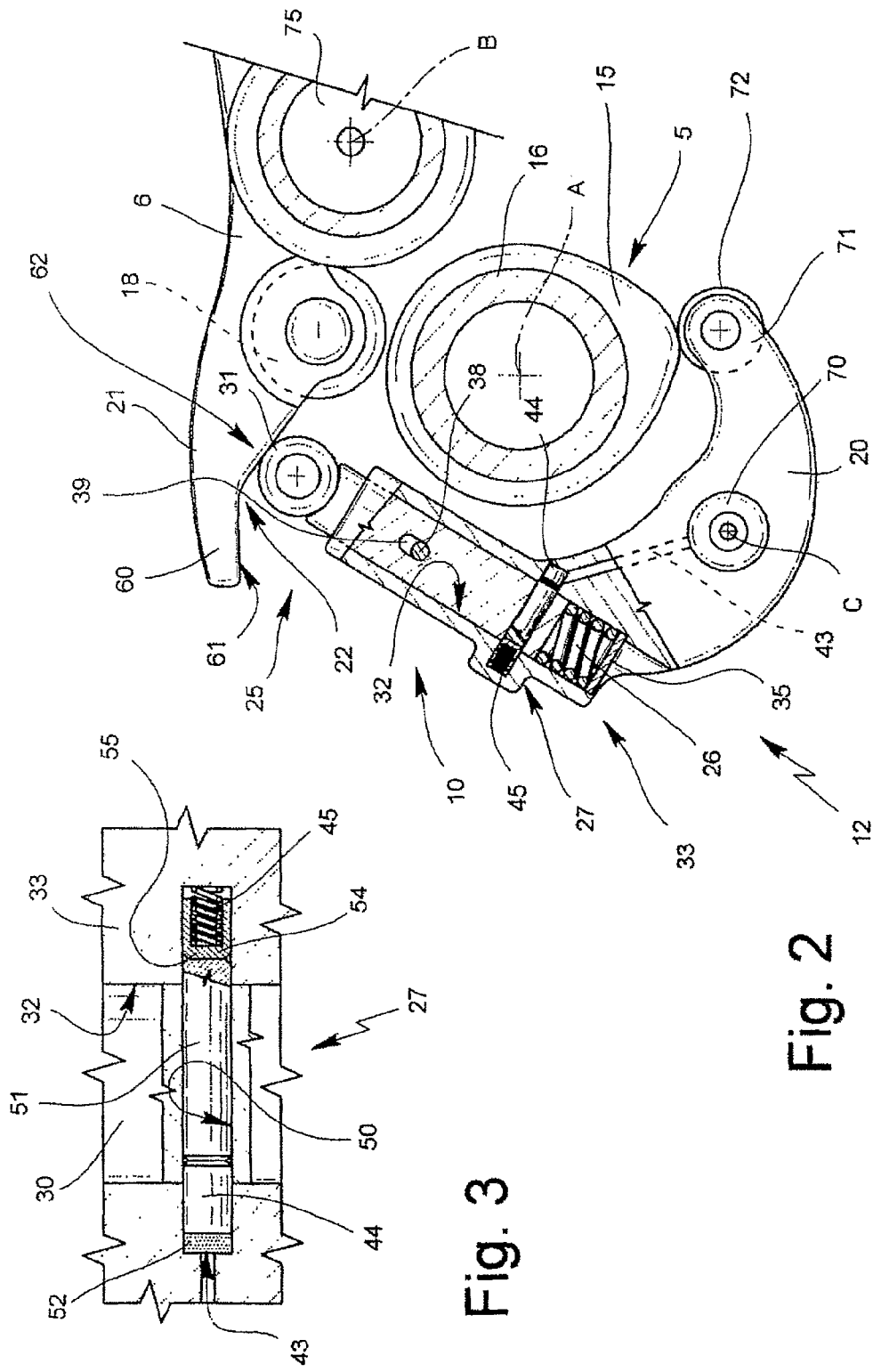

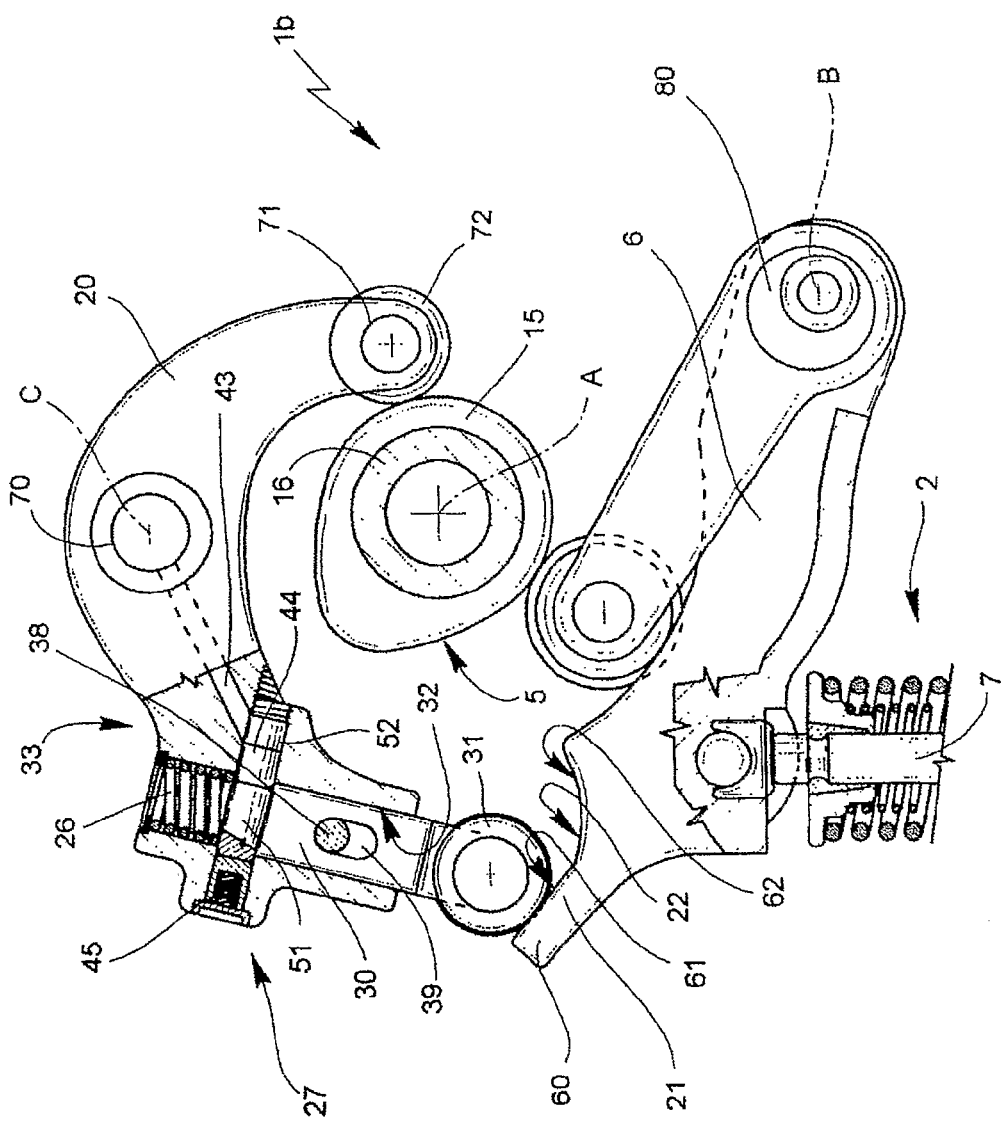

LIFT-CONTROL DEVICE FOR A POPPET VALVE OF AN INTERNAL-COMBUSTION ENGINE OR OPERATING MACHINE

REFERENCE TO RELATED APPLICATIONS

This application claims the benefit of National stage application (under 35 U.S.C. 371) of PCT/IB/2007/002449, filed Jul. 27, 2007 which claims the benefit to Italy Application No. TO2006A000563, filed Jul. 28, 2006.

The present invention relates to a lift-control device for a poppet valve of an internal-combustion engine or operating machine. The invention also relates to a method for control of an internal-combustion engine using the valve-lift control device according to the invention.

It is known that, in particular to control noxious emissions, it would be necessary to be able to control not only the duration of the opening times of the intake and exhaust valves of the engine (which are of the so-called "poppet" type, which have a mushroom-shaped fluid-tight head and a stem provided with a linear motion in a direction perpendicular to the sealing seat of the valve), but also the timing of opening of the valve itself, which is, to a certain extent, independent of the usual timing of opening of the valves, said usual timing envisaging, for example, opening of the intake valves only during the intake phase of the thermodynamic cycle of the engine (for example, the Otto cycle or Diesel cycle) and opening of the exhaust valves only during the exhaust phase of the thermodynamic cycle of the engine.

Known systems for varying the timings of opening of the valves of an internal-combustion engine (or, if need be, also of an operating machine having a positive displacement cycle, for example, a reciprocating positive-displacement compressor) usually act on the camshaft, for example, envisaging cams with a profile with variable geometry along the axis of the shaft and a hydraulic system for moving the camshaft itself axially. However, such systems are costly, complex and do not allow in any case different valve-lift laws to be superimposed to one another on one and the same valve.

Also known are control systems, referred to as variable-phasing control systems, which operate, for example, with valve-control devices (the so-called "tappets") based upon rocker systems. In this case, the valve-lift timings are regulated by acting in the portion of mechanical transmission of motion between the rocker and the stem of the valve. Said systems are, however, far from being versatile, in so far as they are only able to bring forward opening and/or delay closing of the valves themselves.

The aim of the present invention is to overcome the limitations of the known art, providing a lift-control device for a poppet valve, particularly but not exclusively an intake valve or an exhaust valve of an internal-combustion engine, that will be able to impose on one and the same valve laws of valve lift even completely different from one another and that, at the same time, will be relatively simple and inexpensive to produce, will be reliable as regards operation, will have small overall dimensions and will be able to work alongside already existing systems for variation of timing of valve opening, for example for bringing forward opening or for delaying closing of the valve, without replacing them and without interfering with their operation.

On the basis of the invention, a lift-control device for a poppet valve, in particular an intake valve or an exhaust valve of an internal-combustion engine, is consequently provided according to what is defined in claim 1.

In particular, the lift-control device for a poppet valve according to the invention comprises: first valve-lift means, which define a first valve-lift law and are operatively associated to a rocker that acts on a stem of the valve to move the stem according to the first valve-lift law; second valve-lift means, which define a second valve-lift law and which are also operatively associated to the rocker; and means for selective de-activation of the second valve-lift means.

The first valve-lift means consist in a profile of a cam or eccentric acting on the rocker in order to cause it to oscillate about a first axis so as to move the valve stem according to the first valve-lift law, whereas the second valve-lift means consist: in an auxiliary rocker, which co-operates in contact with the first valve-lift means for receiving from said means a motion of oscillation about a second axis parallel to the first; and in a profiled portion of one of the rocker and the auxiliary rocker, having a profile defining the second valve-lift law and co-operating with shoulder means carried by the other of the aforesaid rocker and auxiliary rocker.

The shoulder means are defined by a slider, which is movable along a pre-set path against the action of elastic means between a first operative position and a second operative position, in particular between a position where it is drawn out from and a position where it is retracted into a seat made in a first end of the auxiliary rocker, it being possible for said shoulder means to be selectively blocked in the first operative position via latch means, which are controlled by hydraulic-actuator means that can be activated selectively.

The hydraulic-actuator means preferably comprise a source of pressurized oil, a solenoid valve, and a circuit for supply of oil to a piston for actuation of the latch means, which is countered by a return spring, the solenoid valve being designed to connect the circuit for supply of oil to the piston with the source of pressurized oil and with a discharge, selectively.

The first and second operative positions are located at a pre-set distance along the aforesaid pre-set path, proportional to the extent of a maximum stroke of the valve stem when this is subjected to the second valve-lift law. In particular, the profiled portion is carried by a prong-shaped end of the rocker that acts on the valve stem and projects in cantilever fashion in the direction of the auxiliary rocker and of the shoulder means, and comprises: a first extent defined by an arc of a circumference having a radius of curvature centred on the aforesaid second axis; and a second extent, which is ramp-shaped and is joined with continuity to the first extent.

In this way, it is possible, for example, to implement, according to a further aspect of the invention, a method for control of an internal-combustion engine operating with a thermodynamic cycle including at least one intake phase, at least one compression phase, and at least one exhaust phase, comprising at least the phase of performing:

opening, during the exhaust phase, of at least one intake valve of the internal-combustion engine with a second valve-lift law different from a first valve-lift law for the intake valve that can be applied to said intake valve during the aforesaid at least one intake phase; and/or opening during the compression phase of at least one exhaust valve of the internal-combustion engine with a second valve-lift law different from a first valve-lift law for the exhaust valve that can be applied to said exhaust valve during the aforesaid at least one exhaust phase;

in which the phases of opening with the second valve-lift law of the at least one of said intake valve and exhaust valve are carried out for each valve via the aforesaid auxiliary rocker and a selectively de-activatable hydraulic tappet constituted by the slider with the corresponding hydraulically actuated latch means. It is thus possible to obtain, at any desired moment and hence substantially irrespective of the angle of rotation of the camshaft/an effect of engine brake caused by opening of the exhaust valves during the compression phase and/or an effect of dilution of the fresh air taken in with part of the exhaust gases (aimed at a reduction in NOx emissions) during the intake phase.

The above is achieved with a mechanism that is substantially simple, is relatively inexpensive whilst at the same time ensuring high reliability, is of small overall dimensions, can be implemented even on already existing engines without having to vary substantially the general design thereof, and can operate alongside already existing variable-phasing valve-control systems, without interfering with their operation.

Further aims and advantages of the present invention emerge clearly from the ensuing description of two embodiments thereof, provided purely by way of non-limiting example, with reference to the figures of the annexed drawings, wherein:

FIG. 2 illustrates, substantially with the same scale but with parts in cross-sectional view, a detail of FIG. 1;

FIG. 3 illustrates at an enlarged scale a further detail of the part illustrated in the sectioned view of FIG. 2;

Figure 1:
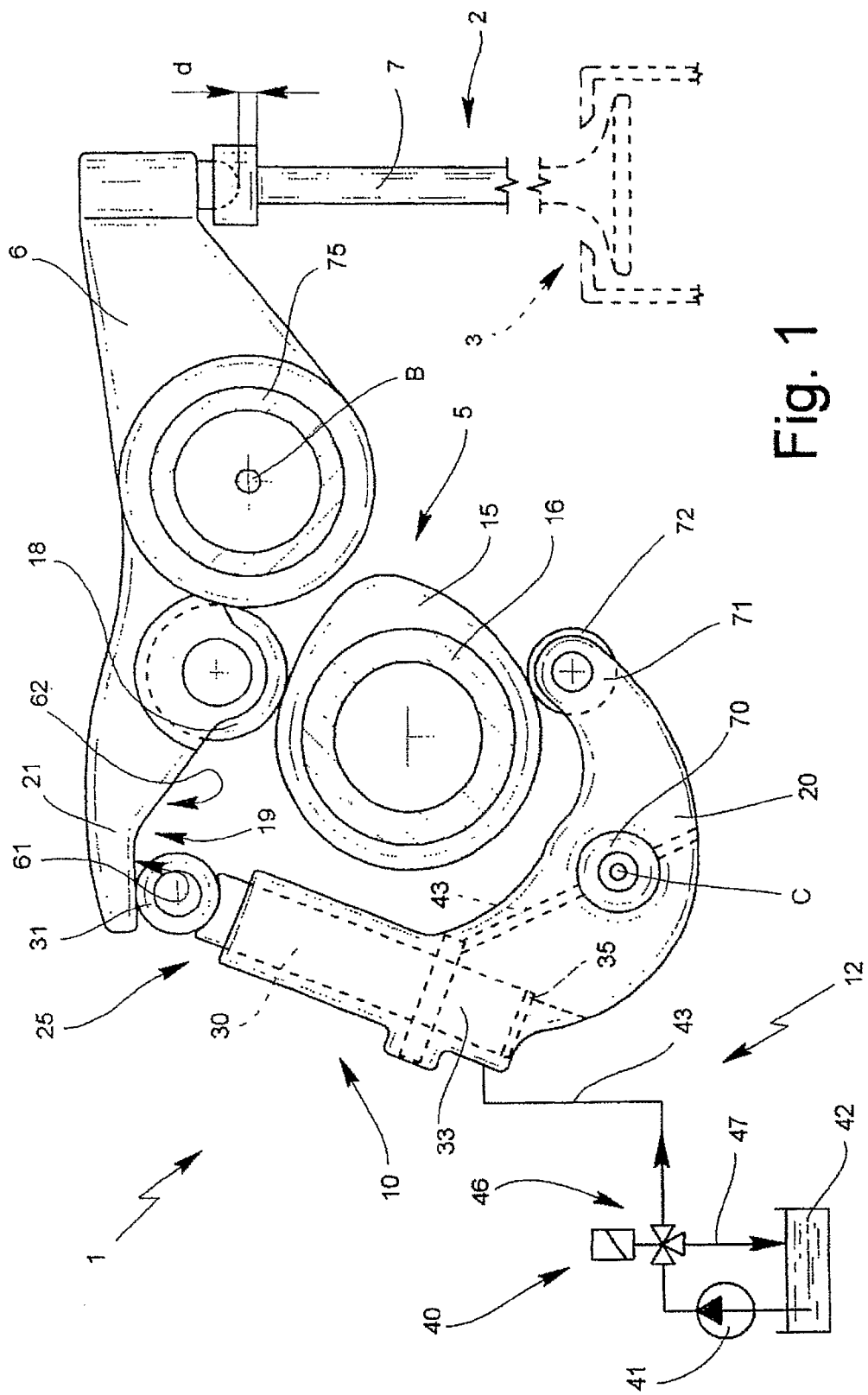
FIG. 1 is a side elevation, in partial cross section, of a lift-control device for a poppet valve, particularly but not exclusively for an internal-combustion engine, made according to the invention.
Figure 4:
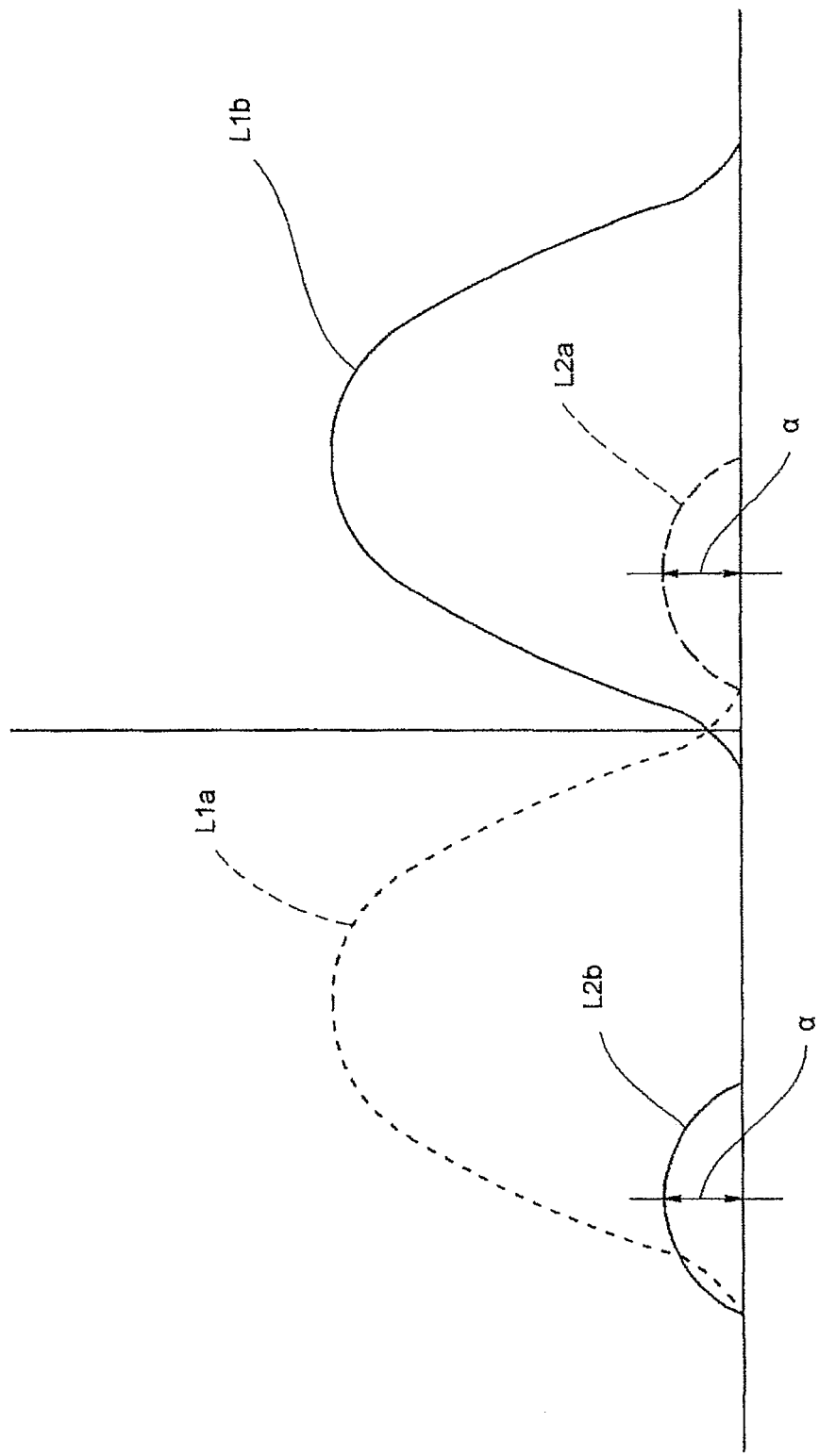

FIG. 4 is a diagram that illustrates the valve-lift laws that can be imposed on the valves of an internal-combustion engine equipped with the valve-lift control device of FIGS. 1 and 2; and FIG. 5 is a side elevation, in partial cross section, of a lift-control device for a poppet valve of an internal-combustion engine made according to a possible variant of the device of FIG. 1. With reference to FIGS. 1 to 4, designated as a whole by 1 is a lift-control device for a poppet valve 2 (only partially illustrated in so far as it is of a well known type), in particular an intake valve or an exhaust valve of an internal-combustion engine 3, known and illustrated schematically only in part for reasons of simplicity. In what follows, specific reference will be made to the application of the control device 1 to intake and/or exhaust valves 2 of an internal-combustion engine 3, but it is clear that the device 1 that will be described is likewise applicable with equal effectiveness, if need be, to an operating machine, for example, a positive-displacement compressor.

The control device 1 comprises first valve-lift means 5, which define a first valve-lift law L1 (FIG. 4) for the valve 2 and are operatively associated to a rocker 6 that acts on a stem 7 of the valve 2 to move the stem 7 according to the first valve-lift law L1. In particular, in the case of an intake valve 2, the valve-lift means 5 will define a known valve-lift law Lib, represented in the right-hand part of the diagram of FIG. 4, which gives on the axis of the abscissa the angle of the output shaft (known and not illustrated) of the engine 3 and on the axis of the ordinate the extent of the vertical displacement of the valve 2 for the different angular positions of the output shaft. In the case of an exhaust valve 2, the corresponding lift means 5 will define a known valve-lift law L1a, represented with a dashed line in the left-hand part of the diagram of FIG. 4.

According to one aspect of the invention, the device 1 further comprises second valve-lift means 10, which define a second valve-lift law L2, respectively 12a in the case of an exhaust valve 2 and L2b in the case of an intake valve 2 (FIG. 4). Said second valve-lift means 10 are also, according to the invention, operatively associated to the rocker 6. Once again according to the invention, the device 1 comprises means 12 for selective de-activation of the second valve-lift means 10 so as to be able to position each time the graphs that define the valve-lift laws L2a and L2b in any position along the axis of the abscissa, i.e., for activating/de-activating said second valve-lift means 10 at any angular position of the output shaft of the engine 3.

According to the non-limiting embodiment illustrated, the first valve-lift means 5 consist of a peripheral profile of a cam 15 or eccentric, which can rotate about an axis A (FIG. 2) and is, in particular, defined by a camshaft 16 connected in a known way to the output shaft of the engine 3, from which it receives the motion of rotation. The cam 15 acts on the rocker 6 in a known way, for example by causing its peripheral profile 5 to slide on a roller 18 carried idle in an intermediate position by the rocker 6 so as to cause oscillation of the latter about a first axis B parallel to the axis A. The position of the axis B and the shape and dimensions of the rocker 6 are chosen so as to move the valve stem 7 according to the first valve-lift law L1a or L1b (according to whether the valve 2 is an exhaust valve or an intake valve, respectively).

The second valve-lift means 10 consist of: a coupling in the form of an auxiliary rocker 20, which co-operates in contact with the first valve-lift means 5, i.e., preferably with the profile of the same cam 15, for receiving from said means a motion of oscillation about a second axis C parallel to the axis B; and a profiled portion 21 of one of the rockers 6 and 20, in the case illustrated the rocker 6, having a profile 22 defining the second valve-lift law L2a (or, respectively, L2b) and co-operating with shoulder means 25 carried by the other of the rockers 6 and 20, in the case illustrated the auxiliary rocker 20.

According to the invention, the shoulder means 25 are movable along a pre-set path and against the action of elastic biasing means 26 (FIG. 2) between a first operative position and a second operative position and can be selectively blocked in the first operative position (illustrated in FIG. 2) via latch means 27, better illustrated in FIG. 3.

In the non-limiting embodiment illustrated, the shoulder means 25 consist of a slider 30, possibly terminating with an idle roller 31, slidably carried in cantilever fashion in a rectilinear seat 32 made through a first end 33 of the auxiliary rocker 20 and facing the rocker 6. The slider 30 is movable in the seat between a drawn-out position (illustrated in FIG. 2), in which it is normally held by the elastic means 26 constituted by a helical spring inserted in the seat 20 between an end wall 35 thereof and the slider 30, and a position where it is retracted within the seat 20, in which only the end of the slider 30 provided with the roller 31 comes out therefrom.

The drawn-out position of the slider 30 corresponds to the aforesaid first operative position of the shoulder means 25, whilst the retracted position of the slider corresponds to the aforesaid second operative position of the shoulder means 25; according to one aspect of the invention, the first and second operative positions are located at a pre-set distance along the aforesaid pre-set path, said pre-set distance being proportional to the extent of a maximum stroke "d" (FIG. 1) of the valve stem 7 when this is subjected to the second valve-lift law L2a or L2b (FIG. 4).

In the case illustrated, the aforesaid pre-set path is defined by the reciprocating rectilinear movement of the slider 30 in the seat 32 between the drawn-out position and the retracted position, and the aforesaid pre-set distance is the stroke of the slider 30. Said stroke is defined by end-of-travel means consisting of a pin 38 slidably mounted in a slot 39, which is oriented in a direction parallel to the seat 32. The pin 38 is mounted through the end 33 of the auxiliary rocker 20 fixedly to the latter so that it passes transversely through the seat 32, and the slot 39 is made so that it passes transversely through the slider in such a way that said slot 39 defines the aforesaid pre-set path, its length being equal to the aforesaid pre-set distance between the first position and the second position. Obviously, an alternative solution with respect to the one illustrated is also possible, in which the slot 39 is made through the end 33 and the pin 38 is carried fixedly by the slider 30. According to a further aspect of the invention, the latch means 27 are controlled by hydraulic-actuator means 40 (FIG. 1) that can be activated selectively, said means comprising a source of pressurized oil constituted by a pump 41 constituting the normal oil pump of the engine 3 for lubrication thereof, which draws the oil from a sump 42 of the engine 3, a circuit 43 for supply of oil to a piston 44 for actuation of the latch means 27, said piston 44 being countered by a return spring 45 (FIG. 3), and a solenoid valve 46 designed to connect selectively the oil-supply circuit 43 with the pump 41 and with a discharge 47 present in the sump 42 constituted by a return circuit for the exhaust oil.

In the case illustrated, the latch means 27 comprise (FIG. 3): a first recess 50 made so that it passes transversely through the slider 30, in a direction transverse to the seat 32; a first pin 51, which is slidably housed in the recess 50 and has substantially the same length as the recess 50 itself; and a second recess 52 and a third recess 54, both of which are blind, are made within the end 33 of the auxiliary rocker 20 in a direction transverse to the seat 32, and give out into said seat in a position such that they are aligned with one another and with the recess 50 when the slider is in the drawn-out position. A second pin, slidably housed in a fluid-tight way within the recess 52, constitutes the piston 44, whilst a third pin 55 is slidably housed within the recess 54 which moreover houses the spring 45, between an end wall thereof and the pin 55, which is preferably a cup-shaped hollow pin, housing inside it part of the spring 45, which is pre-loaded and by which the pin itself is pushed towards the seat 32 against a side wall of the slider 30. Moreover provided in the end 33 of the auxiliary rocker 20 is part of the pipe 43 so as to be able to draw in or discharge selectively (by actuation of control means constituted by the solenoid valve 4 6) pressurized oil between an end wall of the recess 52 and the pin-piston 44.

In this way, when the solenoid valve 46 connects the pipe 43 to the pump 41, the pin 44 is pushed by the pressurized oil, which reaches the recess 52 in a position where the pin is drawn out from the recess 52 itself and such as to project in the seat 32, a position that the pin-piston 44 can assume only when the recesses 50, 52 and 54 are aligned (otherwise, it would be stopped by the side wall of the slider 30) and in which consequently the pin 44 projects partly within the recess 50, coming to engage the slider 30 and blocking any possible motion of sliding thereof and simultaneously pushing the pin 51 in a direction such as to cause it to come out partially on the opposite side from the recess 50 with partial engagement in the recess 54 obtained by pushing against the pin 55 and forcing the latter to recede into the recess 54 against the action of the spring 45, moreover blocking even further the slider 30.

The rocker 6 that acts on said valve stem is provided with a prong-shaped end 60, which extends in cantilever fashion in the direction of the auxiliary rocker 20 and of the shoulder means 25, which are carried by the end 33 of said auxiliary rocker 20. The prong-shaped end 60 is provided, in the direction of the auxiliary rocker 20, with the profiled portion 21, which co-operates in contact, possibly with the interposition of the roller 31, with the shoulder means 25, in the case in point with the end of the slider 30 coming out in cantilever fashion from the seat 32.

The profiled portion 21 comprises a first extent 61 defined by an arc of a circumference having radius of curvature centred on the axis C of rotation of the rocker 20, and a second ramp-shaped extent 62, joined with continuity to the first extent 61 so as to form the continuous profile 22. In the non-limiting example illustrated, the auxiliary rocker 20 is constrained in rotation about the axis C via a supporting pin 70 engaging a middle portion of the auxiliary rocker 20, a second end 71 of which, opposite to the end 33, co-operates in contact, possibly with the interposition of a roller 72, with the profile 5 of the cam 15, on the opposite side with respect to the rocker 6.

In the example of FIGS. 1 and 2, moreover, the rocker is constrained to rotate about the axis B in its middle portion, via a pin 75. According to the variant illustrated in FIG. 5, where for simplicity items that are similar to or the same as the ones already described are designated by the same numbers, the rocker 6 is of the type constrained to oscillate about the axis B in a position corresponding to one end 80 thereof, whilst the cam 15 acts thereon in an intermediate position. For the rest, the device 1*b* illustrated in FIG. 5 is identical to the device 1 of FIGS. 1 and 2.

With the device described it is possible to provide a method for control of the internal-combustion engine 3, which operates by means of a thermodynamic cycle (for example, an Otto cycle or a Diesel cycle) including at least one intake phase, at least one compression phase and at least one exhaust phase, and comprising at least one or both of the following phases:

opening during the exhaust phase of at least one intake valve 2 of the internal-combustion engine 3 with a second valve-lift law L2*b* different from a first valve-lift law L1*b* for the same intake valve 2 that can be applied to said intake valve during at least one intake phase;

opening during the compression phase of at least one exhaust valve 2 of the internal-combustion engine 3 with a second valve-lift law L2*a* different from a first valve-lift law L1*a* for the same exhaust valve 2 that can be applied to said exhaust valve during the at least one exhaust phase.

The phases of opening of the valves 2 with the opening laws L2*a* and L2*b* are carried out for each valve 2 via the auxiliary rocker 20, which co-operates simultaneously with the rocker 6 normally acting on the valves 2 for controlling them according to the laws of valve lift L1*a* or L1*b* and with the control cam 15 that acts on the rocker 6. In particular, the rocker 20 co-operates with the rocker 6 through a sort of selectively de-activatable hydraulic tappet, constituted by the shoulder means 25 and by the latch means 27 with their actuation means 40, said tappet being inserted between the rocker 6 and the auxiliary rocker 20, the latter co-operating also with the cam 15 but only for receiving therefrom an oscillating motion, whilst the selectively activatable valve-lift law is established by the profile 22.

By means the valve-lift law L2*b* it is possible, for example, to enable part of the burnt gases of the engine 3 to be discharged into the intake manifold of the engine itself, and then be taken in by the engine itself in the subsequent cycle, together with the fresh air and with the fuel. This enables a drastic reduction in noxious emissions, in particular NOx. Via the valve-lift law L2*a* it is, instead, possible to discharge part of the fresh air compressed during the compression phase and before the explosion occurs, thus enabling a considerable increase in the action of engine brake, this being obtained without increasing the consumption of fuel, supply of which may be purposely cut off by a cut-off system governed by the engine electronic control unit that actuates the solenoid valve 46.

In any case, the additional valve-lift law L2a, L2b is obtained only at the moment when the cam 15 will impart an appropriate oscillation on the rocker 20 in phase with the rocker 6 and above all, only when the solenoid valve 46 is actuated so as to govern the latch means 27 and thus block the slider 30 in the drawn-out position.

In fact, otherwise, the latch means 27 remain de-activated, and hence the slider 30 remains free to slide within the seat 32. Consequently, when the rocker is made to oscillate so as to push its end 33 towards the appendage or prong-shaped end 60 of the rocker 6, this will not receive any thrust that will be able to cause the valve 2 to perform an additional lift according to the law L2a or L2b, but simply the slider will receive a thrust such as to overcome the countering action of the spring 26 and will come to occupy the position where it is retracted within the seat 32, and then return into the drawn-out position, without ever abandoning the contact with the profile 22, as soon as the end 33 starts moving away again from the end 60, as a result of the oscillation of the rocker 20.

The invention claimed is:

1. A lift-control device for a poppet valve of an internal-combustion engine comprising:
    a first valve-lift configured to define a first valve-lift law and operatively connected with a rocker that acts on a stem of said valve to move said stem of said valve according to the first valve-lift law;
    a second valve-lift configured to define a second valve-lift law and also operatively connected with the rocker; and
    a de-activation mechanism for selective de-activation of the second valve-lift;
    wherein the first valve-lift comprises a profile of a cam or eccentric configured to act on the rocker to cause the rocker to oscillate about a first axis and to move said valve stem according to the first valve-lift law; the second valve-lift comprises: an auxiliary rocker co-operating in contact with the first valve-lift to receive from the first valve-lift a motion of oscillation about a second axis parallel to the first axis; and a profiled portion of one of the rocker and the auxiliary rocker, which has a profile defining the second valve-lift law and co-operating with a shoulder carried by the other of the rocker and the auxiliary rocker; and the shoulder is configured to be movable along a pre-set path and against the action of a biasing mechanism between a first operative position and a second operative position and can be selectively blocked in the first operative position via a latch.

2. The device according to claim 1, wherein the first and the second operative positions are located at a pre-set distance along the pre-set path, the pre-set distance being proportional to the extent of a maximum stroke of said valve stem when the valve stem is subjected to the second valve-lift law.

3. The device according to claim 2, wherein the shoulder comprises a slider slidably carried in cantilever fashion in a rectilinear seat made through a first end of the auxiliary rocker and facing the rocker that acts on said valve stem; the slider being configured to be movable in the seat between a drawn-out position, in which it is normally held by a spring inserted in the seat between an end wall and the slider, and a position where the slider is retracted within the seat; the slider including an end-of-travel mechanism with a pin slidably mounted in a slot oriented in a direction parallel to the seat; the pin being fixedly mounted through the end of the auxiliary rocker, and the slot being made so that it passes transversely through the slider, or vice versa; the slot defining the pre-set path, and the length of the slot being equal to the pre-set distance.

4. The device according to claim 3, wherein the latch comprises: a first recess configured to pass transversely through the slider; a first pin slidably housed in the first recess and of a length substantially equal to that of the first recess; a second recess and a third recess, both of which are blind, are provided within the first end of the auxiliary rocker in a direction transverse to the seat for the slider and opening into the seat, in a position such that they are aligned with one another and with the first recess when the slider is in the drawn-out position; a second pin slidably housed in a fluid-tight way within the second recess; a third pin slidably housed within the third recess; and a spring housed between an end wall of the third recess and the third pin for pushing the third pin towards the seat for the slider; the first end of the auxiliary rocker including a pipe for delivery of pressurized oil between an end wall of the second recess and the second pin, the pipe being selectively connectable, via a control means, to a source of pressurized oil and to a discharge; the second pin being configured to be pushed by pressurized oil present in the second recess into a position where the second pin is drawn out from the second recess and, in the drawn-out position, being insertable into the first recess for pushing the first pin on the opposite side partially outside the first recess and into the third recess, against the third pin and against the action of the spring housed in the third recess.

5. The device according to claim 1, wherein the latch is controlled by a selectively activatable hydraulic actuator mechanism.

6. The device according to claim 5, wherein the hydraulic actuator mechanism comprises a source of pressurized oil, a solenoid valve, and a circuit for supply of oil to a piston for actuation of the latch, said piston being countered by a return spring; the solenoid valve is configured to connect selectively the circuit for supply of oil to said piston to said source of pressurized oil and to a discharge.

7. The device according to claim 1, wherein the rocker acting on said valve stem is provided with a prong-shaped end that extends in cantilever fashion in the direction of the auxiliary rocker and of the shoulder, which are carried by a first end of the auxiliary rocker; the prong-shaped end of the rocker which acts on said valve stem being provided, in the direction of the auxiliary rocker, with the profiled portion, which co-operates in contact with the shoulder.

8. The device according to claim 7, wherein the profiled portion comprises: a first extent including an arc of a circumference having a radius of curvature centered on the second axis; and a second ramp-shaped extent joined with continuity to the first extent.

9. The device according to claim 7, wherein the auxiliary rocker is constrained in rotation about the second axis via a supporting pin engaging a middle portion of the auxiliary rocker, a second end thereof, opposite to the first, co-operating in contact with the profile of the cam or eccentric, on the opposite side with respect to the rocker that acts on said valve stem.

\* \* \* \* \*

UNITED STATES PATENT AND TRADEMARK OFFICE
CERTIFICATE OF CORRECTION

PATENT NO.         : 8,651,073 B2
APPLICATION NO. : 12/375355
DATED                 : February 18, 2014
INVENTOR(S)       : Majo Cecur It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1361 days.

Signed and Sealed this

Twenty-ninth Day of September, 2015

Michelle K. Lee
*Director of the United States Patent and Trademark Office*